(12) United States Patent
Cun et al.

(10) Patent No.: US 11,869,102 B2
(45) Date of Patent: Jan. 9, 2024

(54) SYSTEMS AND METHODS FOR PROVIDING DISTANCE BASED NOTIFICATIONS FOR ELECTRIC VEHICLES

(71) Applicant: Honda Motor Co., Ltd., Tokyo (JP)

(72) Inventors: David Wong Cun, Fountain Valley, CA (US); Eri Izumi Maeda, Rancho Palos Verdes, CA (US); Richard Pham, Lakewood, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/511,413

(22) Filed: Oct. 26, 2021

(65) Prior Publication Data

US 2023/0131063 A1      Apr. 27, 2023

(51) Int. Cl.
*G06Q 50/06* (2012.01)
*G06Q 10/0631* (2023.01)

(52) U.S. Cl.
CPC ....... *G06Q 50/06* (2013.01); *G06Q 10/06316* (2013.01); *G06Q 10/063114* (2013.01)

(58) Field of Classification Search
CPC .......... G06Q 50/06; G06Q 10/063114; G06Q 10/06316
See application file for complete search history.

(56) References Cited

U.S. PATENT DOCUMENTS

| | | | | |
|---|---|---|---|---|
| 5,648,906 A * | 7/1997 | Amirpanahi | ....... | G06Q 30/0284 705/13 |
| 6,253,980 B1 * | 7/2001 | Murakami | ....... | G08G 1/20 224/924 |
| 6,636,145 B1 * | 10/2003 | Murakami | ....... | G07B 15/00 340/5.9 |
| 6,941,197 B1 * | 9/2005 | Murakami | ....... | G07F 17/0042 320/135 |
| 3,532,921 A1 | 9/2013 | Rovik et al. | | |

(Continued)

FOREIGN PATENT DOCUMENTS

| CN | 113313965 A  *  8/2021 |
|---|---|
| WO | WO2018213676     11/2018 |

OTHER PUBLICATIONS

Engel et al. "Charging ahead: Electric-vehicle infrastructure demand" (2018) (https://www.mckinsey.com/industries/automotive-and-assembly/our-insights/charging-ahead-electric-vehicle-infrastructure-demand) (Year: 2018).*

*Primary Examiner* — Sujay Koneru
(74) *Attorney, Agent, or Firm* — RANKIN, HILL & CLARK LLP

(57) ABSTRACT

Systems and methods for providing distance-based indicators for electric vehicles are provided. In one embodiment, a method includes generating a dynamic task list, having a plurality of tasks associated with a vehicle location of a vehicle, in response to a parking event. Each task of the plurality of tasks has a task period. The method also includes determining a charge period for the vehicle at a charging station based on one or more vehicle charging parameters. The method further includes calculating a user return period based on a return distance between a user and the vehicle. The method yet further includes displaying a timing indicator with one or more of the plurality of tasks on the dynamic task list based on the task period and the user return period.

19 Claims, 9 Drawing Sheets

(56) References Cited

U.S. PATENT DOCUMENTS

| | | | |
|---|---|---|---|
| 8,868,343 B1 | 10/2014 | Caine et al. | |
| 9,161,174 B2 | 10/2015 | Parrish et al. | |
| 9,545,853 B1* | 1/2017 | Penilla | B60L 53/14 |
| 9,579,987 B2 | 2/2017 | Penilla et al. | |
| 10,018,479 B2 | 7/2018 | Shastry | |
| 10,042,359 B1* | 8/2018 | Konrardy | B60R 25/102 |
| 10,281,289 B2 | 5/2019 | Nevrekar et al. | |
| 2004/0006498 A1* | 1/2004 | Ohtake | G06Q 10/02 |
| | | | 705/13 |
| 2009/0005969 A1* | 1/2009 | Tamura | G01C 21/3476 |
| | | | 701/533 |
| 2009/0246596 A1* | 10/2009 | Sridhar | H01M 16/006 |
| | | | 429/513 |
| 2009/0313174 A1* | 12/2009 | Hafner | B60L 53/62 |
| | | | 705/80 |
| 2010/0013434 A1* | 1/2010 | Taylor-Haw | B60L 53/64 |
| | | | 320/109 |
| 2011/0130885 A1* | 6/2011 | Bowen | B60L 53/63 |
| | | | 700/291 |
| 2011/0213520 A1* | 9/2011 | Yaguchi | B60L 58/12 |
| | | | 701/22 |
| 2012/0078509 A1 | 3/2012 | Choi et al. | |
| 2012/0095812 A1* | 4/2012 | Stefik | G06Q 50/30 |
| | | | 705/13 |
| 2012/0217928 A1* | 8/2012 | Kulidjian | B60L 53/665 |
| | | | 307/131 |
| 2013/0283211 A1* | 10/2013 | Malkin | G06Q 10/06 |
| | | | 715/844 |
| 2013/0307475 A1* | 11/2013 | Kishiyama | B60L 53/11 |
| | | | 320/109 |
| 2013/0346166 A1* | 12/2013 | Chihara | G07F 15/005 |
| | | | 705/13 |
| 2013/0346308 A1* | 12/2013 | Naito | G06Q 20/145 |
| | | | 705/41 |
| 2014/0089016 A1* | 3/2014 | Smullin | G06Q 10/02 |
| | | | 705/5 |
| 2014/0136414 A1* | 5/2014 | Abhyanker | G05D 1/0011 |
| | | | 701/25 |
| 2014/0164919 A1* | 6/2014 | Ikeda | G05B 19/41865 |
| | | | 715/705 |
| 2014/0192056 A1* | 7/2014 | Bailiang | G09B 29/007 |
| | | | 345/440 |
| 2014/0200804 A1 | 7/2014 | Wippler | |
| 2014/0207373 A1* | 7/2014 | Lerenc | G01C 21/3438 |
| | | | 701/527 |
| 2014/0280292 A1* | 9/2014 | Skinder | G06F 16/24534 |
| | | | 707/767 |
| 2014/0306833 A1* | 10/2014 | Ricci | G06F 16/583 |
| | | | 340/901 |
| 2015/0039391 A1* | 2/2015 | Hershkovitz | B60L 53/65 |
| | | | 705/7.31 |
| 2015/0149221 A1* | 5/2015 | Tremblay | G06Q 10/02 |
| | | | 320/109 |
| 2015/0202975 A1* | 7/2015 | Solomon | B60L 53/65 |
| | | | 705/7.26 |
| 2015/0321570 A1* | 11/2015 | Cun | G06Q 10/06312 |
| | | | 320/109 |
| 2016/0016481 A1* | 1/2016 | Maya | B60W 50/0097 |
| | | | 340/455 |
| 2016/0055429 A1* | 2/2016 | Schwartz | G07C 11/00 |
| | | | 705/5 |
| 2016/0176307 A1* | 6/2016 | Becker | G01C 21/3691 |
| | | | 320/109 |
| 2016/0253707 A1* | 9/2016 | Momin | G01C 21/3461 |
| | | | 705/14.54 |
| 2016/0264011 A1* | 9/2016 | Yasukawa | G06Q 30/02 |
| 2016/0380440 A1* | 12/2016 | Coleman, Jr. | G05F 1/66 |
| | | | 700/295 |
| 2017/0004460 A1* | 1/2017 | Fukuda | G06Q 10/1097 |
| 2017/0123423 A1* | 5/2017 | Sako | G08G 1/00 |
| 2017/0140649 A1* | 5/2017 | Di Censo | G08G 1/09623 |
| 2017/0154474 A1* | 6/2017 | Bae | G06Q 20/00 |
| 2017/0213464 A1* | 7/2017 | Emadi | G06Q 20/322 |
| 2018/0113172 A1* | 4/2018 | Cronin | G06Q 10/109 |
| 2018/0143029 A1* | 5/2018 | Nikulin | G01C 21/3415 |
| 2018/0158031 A1* | 6/2018 | Sethi | G06Q 10/063114 |
| 2018/0222340 A1* | 8/2018 | Zhao | B60L 53/68 |
| 2019/0145788 A1* | 5/2019 | Fischer | G01C 21/3676 |
| | | | 701/123 |
| 2019/0255996 A1* | 8/2019 | Kusumi | B60L 58/12 |
| 2019/0383628 A1 | 12/2019 | Quint et al. | |
| 2020/0149909 A1* | 5/2020 | Beaurepaire | G06Q 10/1093 |
| 2020/0210960 A1* | 7/2020 | Soryal | G01C 21/343 |
| 2020/0242924 A1* | 7/2020 | Publicover | G08G 1/087 |
| 2020/0311848 A1* | 10/2020 | Weldemariam | G06Q 20/4015 |
| 2021/0031648 A1* | 2/2021 | Wang | B60L 53/665 |
| 2021/0138928 A1* | 5/2021 | O'Gorman | G06Q 30/0283 |
| 2021/0262811 A1* | 8/2021 | Zellner | G01C 21/3492 |
| 2022/0237545 A1* | 7/2022 | Whitham | G06Q 10/06316 |
| 2022/0308647 A1* | 9/2022 | Nishizaka | G06F 1/28 |

* cited by examiner

SYSTEMS AND METHODS FOR PROVIDING DISTANCE BASED NOTIFICATIONS FOR ELECTRIC VEHICLES

BACKGROUND

Increasingly, vehicles are designed to be recharged using charging stations. For example, an electric vehicle may include batteries which store power received from a charging station in an electrochemical cell. The charging station and/or the vehicle may indicate how much time it will take the charging station to provide the vehicle a predetermined amount of charge. However, a user associated with the vehicle may leave the vehicle as the vehicle receives the charge. Accordingly, the user may be unaware of the amount of time it will take the charging station to provide the vehicle the predetermined amount of charge.

BRIEF DESCRIPTION

According to one aspect, a system for providing distance-based notifications for electric vehicles is provided. The system may include a processor and a memory storing instructions that when executed by the processor cause the processor to generate a dynamic task list, having a plurality of tasks associated with a vehicle location of a vehicle, in response to a parking event. Each task of the plurality of tasks has a task period. The instructions further cause the processor to determine a charge period for the vehicle at a charging station based on one or more vehicle charging parameters. The instructions further cause the processor to calculate a user return period for a user based on a return distance between the user and the vehicle. The instructions further cause the processor to display a timing indicator with one or more of the plurality of tasks on the dynamic task list based on the task period and the user return period.

According to another aspect, a method for providing distance-based notifications for electric vehicles is provided. The computer-implemented method includes generating a dynamic task list, having a plurality of tasks associated with a vehicle location of a vehicle, in response to a parking event. Each task of the plurality of tasks has a task period. The computer-implemented method also includes determining a charge period for the vehicle at a charging station based on one or more vehicle charging parameters. The computer-implemented method further includes calculating a user return period of a user based on a return distance between the user and the vehicle. The computer-implemented method yet further includes displaying a timing indicator with one or more of the plurality of tasks on the dynamic task list based on the task period and the user return period.

According to a further aspect, a non-transitory computer readable storage medium storing instructions that when executed by a computer, which includes a processor to perform a method is provided. The method includes generating a dynamic task list, having a plurality of tasks associated with a vehicle location of a vehicle, in response to a parking event. Each task of the plurality of tasks has a task period. The method also includes determining a charge period for the vehicle at a charging station based on one or more vehicle charging parameters. The method further includes calculating a user return period of a user based on a return distance between the user and the vehicle. The method yet further includes displaying a timing indicator with one or more of the plurality of tasks on the dynamic task list based on the task period and the user return period.

DETAILED DESCRIPTION

Figure 1:
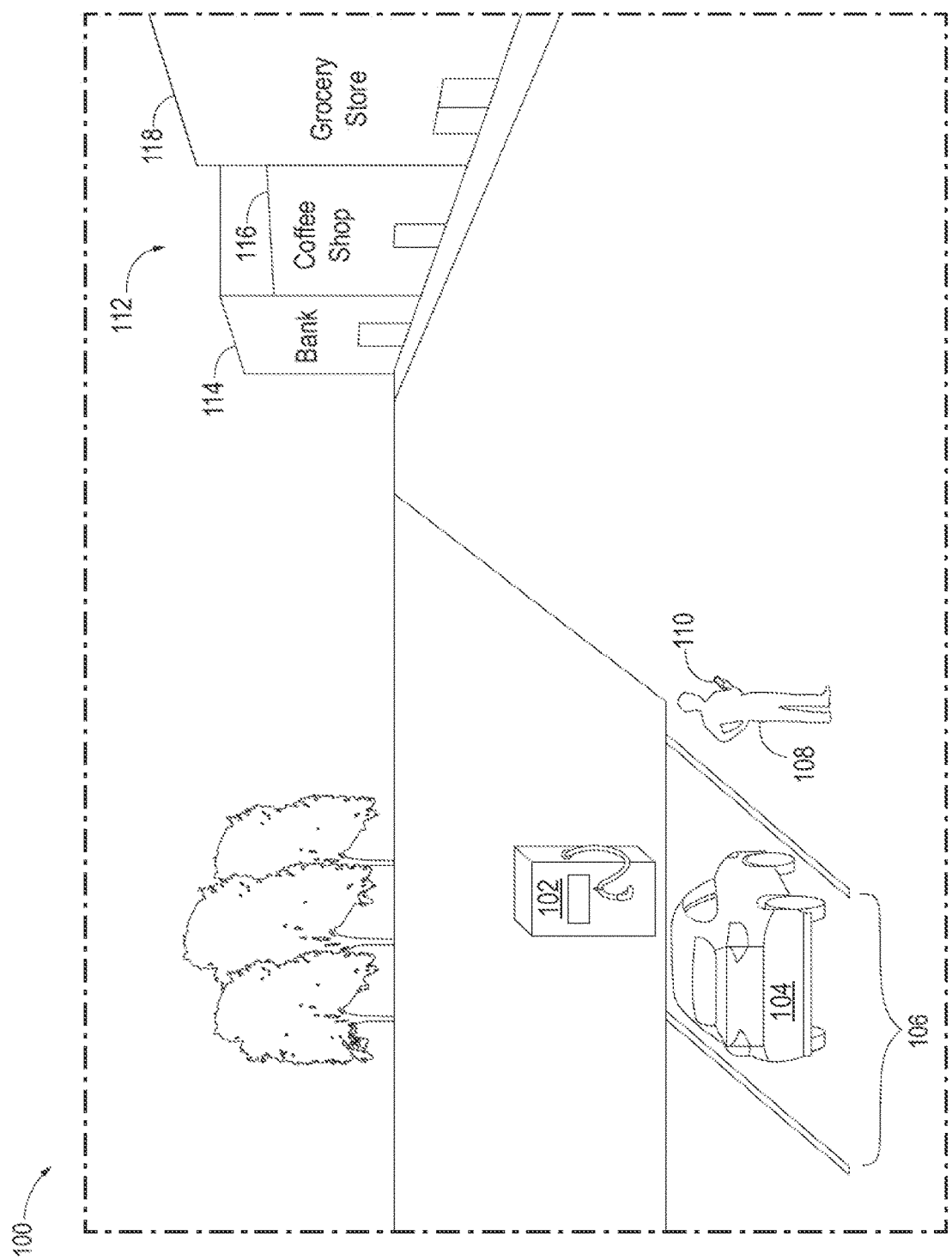
FIG. 1 is a schematic view of an exemplary parking area having a charging station, according to one embodiment.

While the number of available charging stations is increasing, typically, a parking lot or structure may only have a few parking spots where vehicles may access the charging stations. For convenience, charging stations may be positioned in parking structures and lots near retail and business locations to allow users to visit the retail and business locations while charging their vehicle. During a long-distance trip or even during a routine charging session, a user may opt to leave their vehicle during charge in order to eat, shop, or take a bathroom break, etc. While users are aware of approximately how long a charging session may last, the length of the charging session may vary based on charging parameters, such as state of charge (SOC) of the vehicle, usage of the charging station or charging entity by other vehicles, charging speed, ambient temperature, grid demand, etc. This 'fluctuation' of charging time adds uncertainty to the length of the charging session.

If a user does not return promptly, a vehicle may occupy a charging station even after it has been charged to a predetermined SOC limit. Suppose that a user is planning to visit a bank, coffee shop, and grocery store, but that the vehicle associated with the user only needs to charge for approximately fifty minutes to reach a predetermined SOC limit. One hour may not be enough to complete tasks at the bank, coffee shop, and grocery store. The fluctuation of the charging time may cause the user to unnecessarily skip one or more tasks or erroneously assume there is sufficient time to complete all of the tasks.

If the vehicle finishes charging before the user returns, other vehicles are not able to access the charging station to receive a charge while the user's vehicle is sitting in the parking space not receiving a charge. Some charging stations have implemented an idle penalty for vehicles that occupy the parking space associated with the charging station when not receiving a charge. Thus, the user may be reticent to leave a charging vehicle or experience pressure or anxiety to return to the vehicle prematurely to avoid being assessed an idle fee. Accordingly, the user may unnecessarily skip one or more tasks due to idle penalty anxiety.

The systems and methods described herein provide distance-based notifications for electric vehicles. In particular, a dynamic task list may be generated based on the location of the charging station. Continuing the example from above, suppose that the location of the charging station is associated with a number of tasks including making a withdrawal at a bank, applying for a loan at a bank, getting a latte at a coffee shop, writing a screen play at a coffee shop, using a restroom, and grocery shopping. These tasks may be included on the dynamic task list. Furthermore, the tasks on the dynamic task list may be associated with a task period that is an estimated amount of time it will take to complete a specific task. For example, making a withdrawal at a bank may have a task period of ten minutes, whereas shopping at the grocery store has a task period of seventy-five minutes.

By determining a charge period for the vehicle at an associated charging station and the amount of time it will take the user to return from their current location, a timing indicator can be generated for the task. The timing indicator can be applied to a task to indicate the predicted ability of the user to perform a task and return to the vehicle before the charge period elapses. For example, the dynamic task list may include making a withdrawal at a bank and shopping at the grocery store. If charge period for the vehicle is sixty minutes and the user is estimated to be ten minutes away based on the distance of the user from the vehicle, then a timing indicator may indicate that making a withdrawal at a bank is possible to complete before the charge period elapses. The user may receive a push notification that making a withdrawal at a bank is possible or the task associated with making a withdrawal at a bank may be displayed on the dynamic task list in green. However, because grocery shopping is estimated to take seventy-five minutes and the return time is ten minutes, the total time that the user would be away from the vehicle is eighty-five minutes. Eighty-five minutes exceeds the sixty-minute charge period. Accordingly, the task indicator for the task associated with grocery shopping at the grocery store may be displayed in red. Thus, the timing indicator may provide the user with different estimated levels of whether or not the user can complete a particular task return to the vehicle before the vehicle finishes charging. Because the timing indicators account for the distance between the user and the vehicle, the timing indicator may additionally allow the user to determine when to return to their vehicle. Moreover, the user may avoid incurring idle penalties as the user can determine when to return to the vehicle before the charge period elapses while still optimizing the number of tasks that can be performed.

Definitions

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect network (LIN), among others.

"Charging station," as used here, refers to an access point to an energy source that a vehicle may engage to receive a charge. Accordingly, the charging station is an element in an energy infrastructure capable of transferring energy, for example, from the grid to a vehicle. The charging station may include a connector to connect to the vehicle to the charging station. For example, the charge connector may include a range of heavy duty or special connectors that conform to the variety of standards, such as DC rapid charging, multi-standard chargers, and AC fast charging, etc.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computers and/or may be distributed between multiple computers.

"Computer communication," as used herein, refers to a communication between two or more communicating devices (e.g., computer, personal digital assistant, cellular telephone, network device, vehicle, vehicle computing device, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface," as used herein may include input and/or output devices for receiving input and/or devices for outputting data. The input and/or output may be for controlling different vehicle features, which include various vehicle components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface, which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. A database may be stored, for example, at a disk, data store, and/or a memory.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, plasma display panels, touch screen displays, among others, that are often found in vehicles to display information about the vehicle. The display may receive input (e.g., touch input, keyboard input, input from various other input devices, etc.) from a user. The display may be accessible through various devices, for example, though a remote system. The display may also be physically located on a portable device, mobility device, or vehicle.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a portable device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Station systems," as used herein may include, but is not limited to, any system that may be used to enhance the charge capability, use, and/or safety of a charging station. Exemplary station systems include, but are not limited to: a monitoring system, a vehicle identification system, a user detection system, communication system, a charge allocation system, a charge management system, a scheduling system, a sensory system, and a camera system among others.

A "user," as used herein may include, but is not limited to, one or more biological beings exerting a demand on a source of energy, such as an electrical grid. The user may be a driver or a passenger of a vehicle.

"Value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

"Vehicle," as used herein, refers to any moving vehicle powered wholly or partially by any form of rechargeable energy. The term "vehicle" includes, but is not limited to, cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle that is capable of carrying one or more users and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle. The autonomous vehicle may carry one or more users. Further, the term "vehicle" may include vehicles that are automated or non-automated with pre-determined paths or free-moving vehicles.

"Vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), a monitoring system, an audio system, a sensory system, an interior or exterior camera system among others.

I. Systems Overview

Referring now to the drawings, the showings are for purposes of illustrating one or more exemplary embodiments and not for purposes of limiting the same. FIG. 1 is a parking area 100 including the charging station 102. The charging station 102 provides energy to vehicles, such as the vehicle 104, here shown in parking space 106. Here, the charging station 102 is specifically associated with the parking space 106. However, the charging station 102 may be associated with a plurality of parking spaces.

In one or more embodiments, the charging station 102 may include charging equipment that may be installed in a private or public location for example, at a public (e.g., non-networked) or private (e.g., networked) charging station(s). The charging station 102 may include a charging station identification designation (e.g., identification number, serial number, alpha-numeric code, station name) that may be used to identify a particular charging stations. The charging station 102 may replenish the vehicle 104 using a charging energy source type that indicates the type of energy the charging station 102 provides. Energy may include clean renewable energy and non-renewable energy. Clean renewable energy may include, solar energy, hydro energy, biomass energy, wind energy, among others. Non-renewable energy may include electricity from a grid source supplied by one or more utility providers, and in the case of hybrid vehicles, fossil fuels.

In one or more configurations, the vehicle 104 may be capable of being fast charged based on fast charging components (not shown) that may be operably connected to the vehicle 104. Fast charging may enable the vehicle 104 to be charged at one or more charging speed tiers that provide a higher charging power (e.g., voltage, power, etc.) than a default charging speed tier or a slower charging speed tier. In some cases, the charging station 102 may include fast charging electric charging equipment (not shown) that may be facilitate the charging of the vehicle 104 at the one or more charging speed tiers.

In particular, the charging station 102 may provide one or more charging speed tiers that provide a default charging speed (e.g., where a default amount of charging power is provided to charge the vehicle 104 at a default charging speed) and/or one or more levels of fast charging speeds at one or more charging voltages. For example, one or more fast charging speed tiers may provide one or more levels of fast charging from a default charging speed tier or one or more slower charging speed tiers that may provide slower charging at one or more lower charging voltages (e.g., increase from 240 volts to 480 volts) to more quickly charge the vehicle 104 to the adjusted SOC.

In some embodiments, a user 108, associated with the vehicle 104, may occupy the parking area 100. The user 108 user may be a vehicle occupant. The user 108 may also have a portable device 110, such as a phone, key fob, personal fitness device, and activity tracker, among others. In another embodiment, the user 108 may be remotely located from the vehicle 104. For example, the vehicle 104 may have autonomously driven to the parking area 100 while the user 108 is somewhere else, such as a vehicle location 112. The vehicle location 112 may be a retail outlet, office, residence, manufacturer, hospital, restaurant, etc. The vehicle location 112, for example, may be a shopping center associated with the parking space 106, a bank 114, a coffee shop 116, and a grocery store 118.

Figure 2:
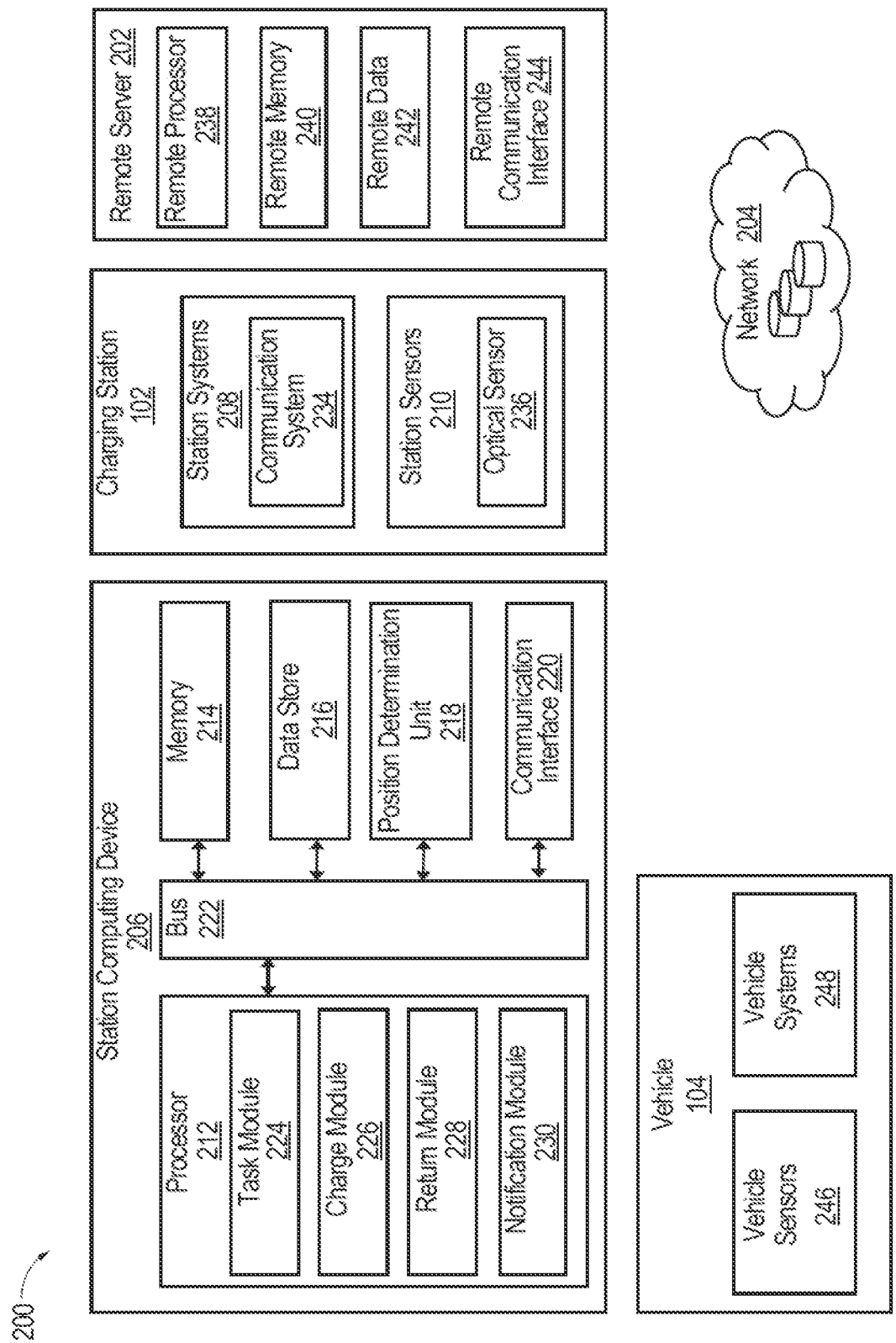
FIG. 2 is a block diagram of an operating environment for providing distance-based notifications for electric vehicles, according to one embodiment.

The user 108 and/or the vehicle 104 may access an operating environment 200, shown in FIG. 2, to charge the vehicle 104 to provide distance-based notifications for the vehicle 104. FIG. 2, a block diagram of the operating environment 200 for providing distance-based notifications for electric vehicles according to an exemplary embodiment. One or more of the components of the operating environment 200 may be considered in whole or in part a vehicle communication network. The charging station 102 communicates with a remote server 202 over a network 204 and a computing device 206. The computing device 206 may be provided at the charging station 102, the portable device 110, the remote server 202, or other remote location operably connected to the charging station 102 and/or the remote server 202 via the network 204.

Station systems 208 and station sensors 210 communicate information about the charging station 102 or the physical environment (e.g., the parking area 100) of the charging station 102 to the computing device 206. The computing device 206 may be capable of providing wired or wireless computer communications utilizing various protocols to send/receive electronic signals internally to/from components of the operating environment 200. Additionally, the computing device 206 may be operably connected for internal computer communication via the bus 222 (e.g., a Controller Area Network (CAN) or a Local Interconnect Network (LIN) protocol bus) to facilitate data input and output between the computing device 206 and the components of the operating environment 200.

Generally, the computing device 206 includes a processor 212, a memory 214, a data store 216, a position determination unit 218, and a communication interface 220, which are each operably connected for computer communication via a bus 222 and/or other wired and wireless technologies defined herein. The computing device 206, may include provisions for processing, communicating, and interacting with various components of the charging station 102, the vehicle 104, the remote server 202, and other components of the operating environment 200. As discussed above, the computing device 206 may be implemented with the charging station 102 or the vehicle 104, for example, as part of a telematics unit, a head unit, an infotainment unit, an electronic control unit, an on-board unit, or as part of a specific control system, among others. In other embodiments, the computing device 206 may be implemented remotely for example, with a portable device 110 or the remote server 202, connected via the network 204.

The processor 212 may include logic circuitry with hardware, firmware, and software architecture frameworks for remote control of the charging station 102. Thus, in some embodiments, the processor 212 may store application frameworks, kernels, libraries, drivers, application program interfaces, among others, to execute and control hardware and functions discussed herein. For example, the processor 212 may include a task module 224, a charge module 226, a return module 228, and a notification module 230, although the processor 212 may be configured into other architectures. Further, in some embodiments, the memory 214 and/or the data store 216 may store similar components as the processor 212 for execution by the processor 212.

The modules of the processor 212 may access the position determination unit 218 via the bus 222. The position determination unit 218 may include hardware (e.g., sensors) and software to determine and/or acquire position data about the vehicle 104. For example, the position determination unit 218 may include a global positioning system (GPS) unit (not shown) and/or an inertial measurement unit (IMU) (not shown). Thus, the position determination unit 218 may provide a geo-position of the charging station 102, the vehicle 104, the user 108, and the portable device 110, among others based on satellite data from, for example, a global position source (not shown), or from any Global Navigational Satellite infrastructure (GNSS), including GPS, Glonass (Russian) and/or Galileo (European). Further, the position determination unit 218 may provide dead-reckoning data or motion data from, for example, a gyroscope, accelerometer, magnetometers, among others.

The communication interface 220 may include software and hardware to facilitate data input and output between the components of the computing device 206 and other components of the operating environment 200, the charging station 102, the vehicle 104, and/or the portable device 110. Specifically, the communication interface 220 may include network interface controllers (not shown) and other hardware and software that manages and/or monitors connections and controls bi-directional data transfer between the communication interface 220 and other components of the operating environment 200, the charging station 102, the vehicle 104, and/or the portable device 110 using, for example, the network 204.

Referring again to the charging station 102, the station systems 208 may include any type of vehicle control system and/or vehicle described herein to enhance the charging station 102 and/or safety of the charging station 102. Here, the station systems 208 may include a communication system 234. The communication system 234 may facilitate communication from the charging station 102 and access the communication protocols of other entities. For example, when communicating with the vehicle 104, the communication system 234 may determine a media access control (MAC) address of the vehicle 104. The communication system 234 may also facilitate communication with the user 108 via, for example, the portable device 110.

The station sensors 210, may include various types of sensors for use with the charging station 102 for detecting and/or sensing a parameter of the charging station 102, charging information, and/or the environment surrounding the charging station 102. For example, the station sensors 210 may provide charging information about the current charge state of the charging station 102. The station sensors 210 may include, but are not limited to proximity sensors, vision sensors, motion sensors, environmental sensors, and charge sensors, among others. The station sensors 210 may be any type of sensor, for example, acoustic, electric, environmental, imaging, light, pressure, force, moisture, thermal, temperature, proximity, among others. For example, the station sensors 210 may include an optical sensor 236 for converting light information into electrical signals.

Using the system and network configuration discussed above, the computing device 206 may generate notifications for a user regarding different tasks associated with the location of the vehicle 104. In particular, the computing device 206 may generate one or more notifications including timing indicators for the task included on the dynamic task list. The charge module 226 may communicate with the charging station 102, such that the computing device 206 receives one or more charge parameters including the charging rate, the type of charge provided, etc. for the charging station 102 as well as the number of vehicles being charged by the charging entity of the charging station 102. For example, the charging station 102 may be operably connected for computer communication with the vehicle 104, additional electric vehicles (not shown), the computing device 206, and/or the remote server 202, for example, to transmit and receive data (e.g., charge parameters, charging data, feedback, vehicle system data, to and from the vehicle 104, any additional vehicles, the remote server 202 and/or the computing device 206. The remote server 202 may include a remote processor 238, remote memory 240, remote data 242, and remote communication interface 244. The remote server 202 may include information about the vehicle location 112.

The vehicle 104 includes vehicle sensors 246 and vehicle systems 248. Vehicle data can include information related to the vehicle 104 including data from the vehicle sensors 246 and/or the vehicle systems 248. Exemplary vehicle data includes, but is not limited to, charging data including the charging parameters, vehicle model, vehicle make, vehicle identification number, information about the environment. The vehicle sensors 246 can include, but are not limited to, vehicle speed sensors, accelerator pedal sensors, brake sensors, throttle position sensors, transmission position sensors, wheel sensors, fuel cell sensors, among others. The vehicle sensors 246 may also include, but are not limited to, cameras mounted to the interior or exterior of the vehicle 104 and radar and laser sensors mounted to the exterior of the vehicle 104. Further, the vehicle sensors 246 can include sensors external to the vehicle 104 (accessed, for example, via the network 204 of FIG. 2), for example, external cameras, radar and laser sensors on other vehicles in a vehicle-to-vehicle network, street cameras, surveillance cameras, among others.

The vehicle sensors 246 are operable to sense a measurement of vehicle data associated with the vehicle 104, the vehicle environment, the vehicle systems 248, and/or the user 108, and generate a data signal indicating said measurement of the vehicle data. These data signals can be converted into other data formats (e.g., numerical) and/or used by the vehicle systems 248 to generate other data metrics and parameters. It is understood that the vehicle sensors 246 can be any type of sensor, for example, acoustic, electric, environmental, optical, imaging, light, pressure, force, thermal, temperature, proximity, among others. The vehicle data can also be received from the one or more vehicle systems 248. The vehicle systems 248 may include and/or be operably connected for computer communication to one or more of the vehicle sensors 246. The vehicle systems 248 may also be controllable based on the vehicle data and or the user data. The vehicle data and/or user data may also be used by the vehicle systems 248 to alter the manner in which the vehicle 104 operates. Detailed embodiments describing exemplary methods using the system and network configuration discussed above will now be discussed in detail.

II. Methods

Figure 3:
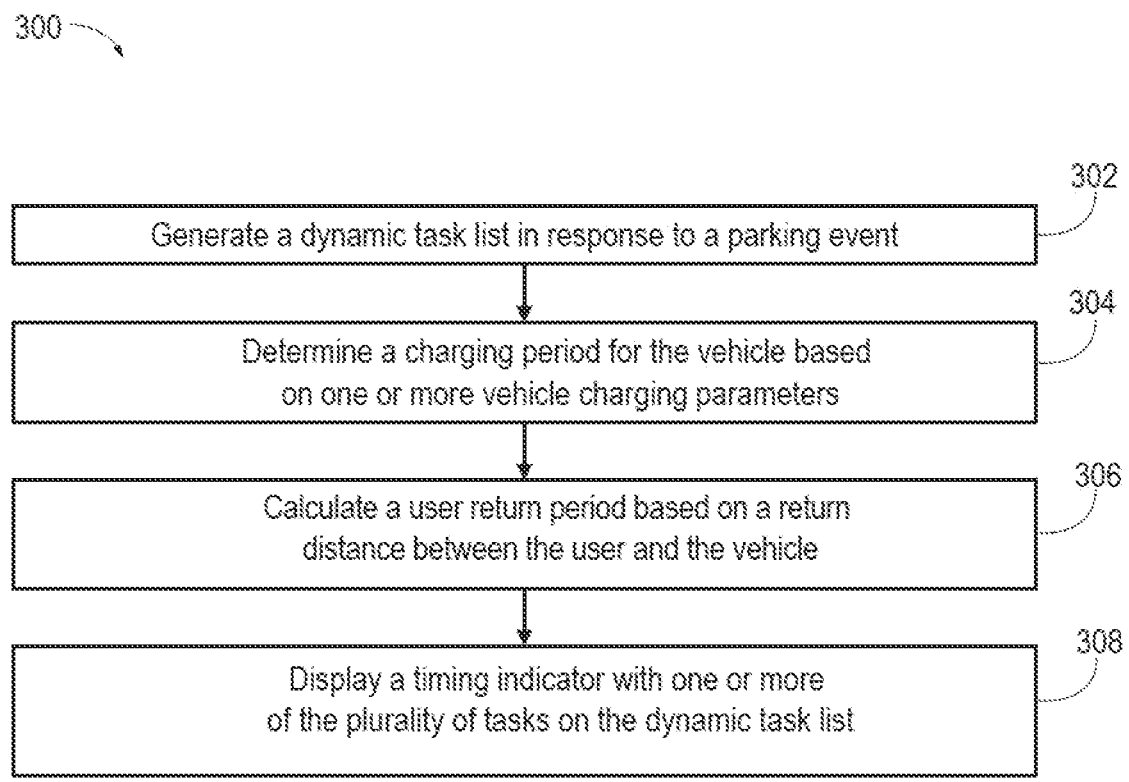
FIG. 3 is a process flow for providing distance-based notifications for electric vehicles, according to one embodiment.

Referring now to FIG. 3, a method 300 providing distance-based notifications for electric vehicles according to an exemplary embodiment is provided. FIG. 3 will be described with reference to FIGS. 1 and 2. As shown in FIG. 3, the method 300 may be described by a number of steps. For simplicity, the method 300 will be described by these steps, but it is understood that the steps of the method 300 may be organized into different architectures, blocks, stages, and/or processes.

Figure 4:
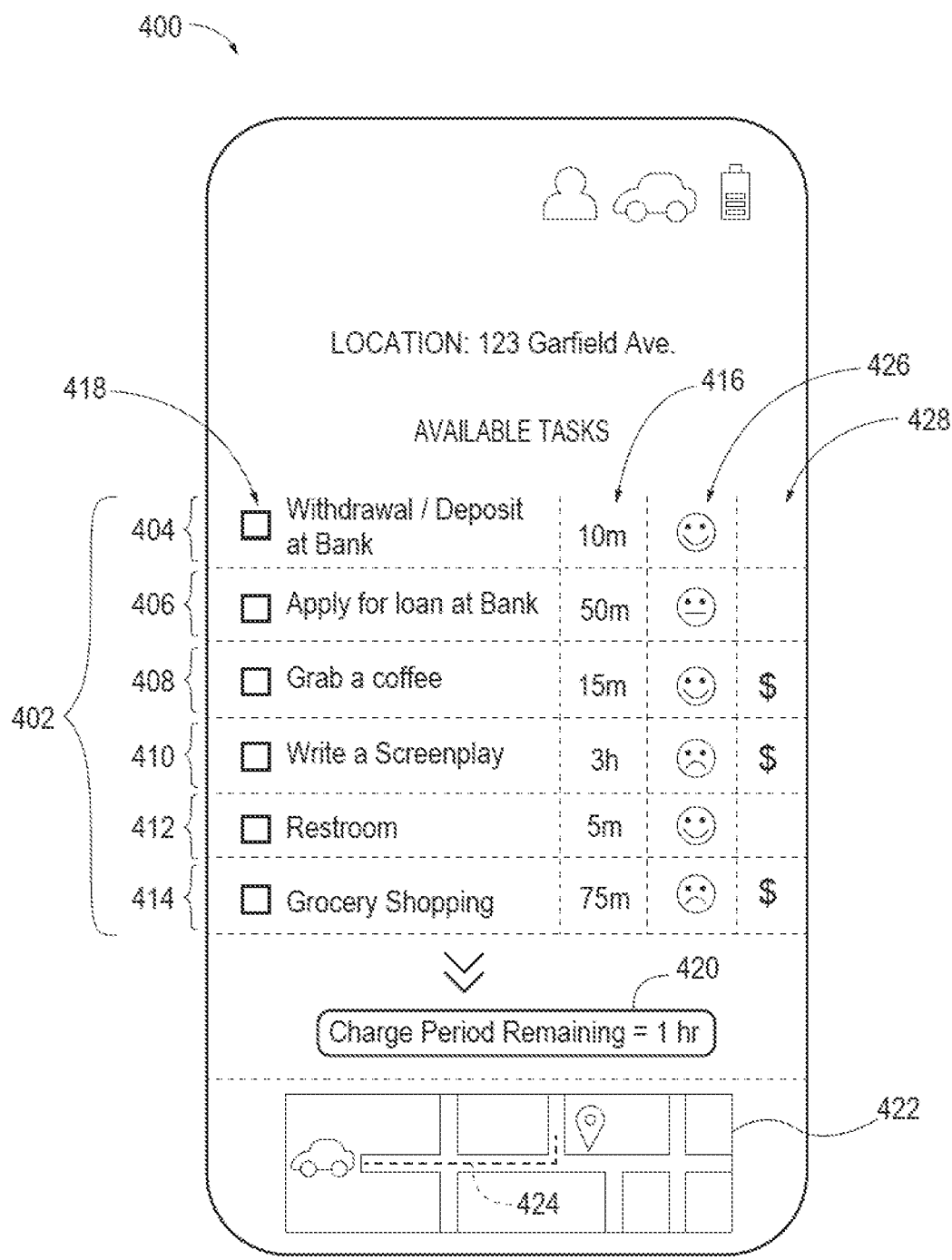
FIG. 4 is schematic view of an exemplary user interface for providing distance-based notifications for electric vehicles, according to one embodiment.

At block 302, the method 300 includes the task module 224 generating a dynamic task list including a plurality of tasks associated with the vehicle location 112. The location may be a retail plaza having a number of retail and business entities including, for example, a bank 114, a coffee shop 116, and a grocery store 118. The task list may include tasks for one or more of the retail and business entities. For example, FIG. 4 illustrates a user interface 400 having a dynamic task list 402. The dynamic task list 402 include a first task 404 for making a withdrawal or deposit at the bank 114, a second task 406 for applying a loan at the bank 114, a third task 408 for getting a coffee at the coffee shop 116, a fourth task 410 for writing a screen play at the coffee shop 116, a fifth task 412 for using the restroom at the coffee shop 116, and a sixth task 414 for grocery shopping at the grocery store 118.

The dynamic task list 402 may be generated based on task data received from the user 108, other users, and/or the retail and business entities. For example, the user 108 may have a user profile that includes historical data. Suppose that the user 108 has visited the vehicle location 112 previously; task data associated with the previous visits may be stored with the user profile.

The task data may include a number of previous visits, date and time of previous visits, previous completed task, task periods for previously completed tasks, previous incentive information, etc. The task period 416 is the length of time it takes to complete a particular task at the vehicle location 112. For example, the task period 416 of the first task 404 may be the amount of time it has previously taken the user 108 to make a withdrawal at the bank 114. In one embodiment, the task period 416 may be measured from the time the user 108 enters the bank 114 and leaves the bank 114. For example, location data from the portable device 110 may be used to determine when the user enters and exits the vehicle location 112. The user profile may be used to determine the task period 416; alternatively, the task module 224 may determine the task period 416. In another embodiment, the task period may be estimated based on task data associated with the user's activity. For example, if the user 108 has mobile ordered a latte, the task data may include tracking the user 108 when the user is within a threshold distance of the coffee shop 116 to determine the task period 416 for the task of getting coffee. In yet another embodiment, the user 108 may self-report the task period. The task period 416 may be displayed on the user interface 400.

The task module 224 may also estimate task periods based on a schedule associated with the user profile. For example, the schedule may indicate the ending time of an event. The schedule may be associated with the user 108 or the vehicle location 112. Suppose the vehicle location 112 includes a cinema. The schedule may be the listing of movie times and run times associated with the cinema. The task period may be the runtime, such as 90 minutes, of the next movie listed on the schedule after the arrival of the vehicle 104 at the vehicle location 112.

The schedule may be received from the vehicle 104 and/or the portable device 110. For example, the vehicle 104 may access the portable device 110 or the remote server 202 to retrieve the schedule. In another embodiment, the schedule may be maintained specifically for vehicle 104. The schedule may be monitored, managed, and/or operated by a third party using the remote server 202. Accordingly, the schedule may be generated by the remote processor 238, stored in the remote memory 240, or included in the remote data 242. The schedule may also be based on the historical data of the user 108. For example, the user may frequent the vehicle location 112 and return to the vehicle 104 at approximately the same time. Suppose that the vehicle location 112 is an office. The user 108 may return to the vehicle 104 at 5:30 PM when the vehicle 104 is engaged with a charging station 102 associated with the vehicle location 112. Accordingly, the task module 224 may estimate the task period based on the historical data.

The task data may also be crowd sourced from other users completing tasks at the vehicle location 112. For example, task data may be aggregated from other user profiles. In this manner, the task module 224 may receive or calculate task data, such as the task period from other sources. In one embodiment, the task data may be received from the remote server which may access or store user profiles. In another embodiment, a retail or business entity may provide the task module 224 with the task data for one or more tasks. For example, the task module 224 may receive one or more tasks from the bank 114 when the vehicle 104 is present at the vehicle location 112 such that when the vehicle 104 is within a predetermined distance of the vehicle location 112. The dynamic task list 402 may be automatically populated with tasks based on the proximity of the vehicle location 112 In yet another embodiment, the task module 224 may calculate task data, in part, by identifying patterns in the task data. For example, the task module 224 may identify whether this is the first visit to the location by the user. The task module 224 may identify a reoccurring event (e.g., lesson, class, gym session, etc.).

The task module 224 may generate one or more tasks dynamic task list 402 based on the likelihood of the user 108 to complete the task. The likelihood of the user 108 to complete the task may be based on the user profile and/or the task period 416. For example, the task module 224 may identify a pattern of user behavior. Suppose that the date is Tuesday and the historical data of the user profile indicates that on previous Tuesdays the user has visited the bank 114. Then the tasks may be ordered on the dynamic task list 402 with the tasks associated with the bank 114 first, such as the first task 404 and the second task 406. In this manner, the dynamic task list may be tailored to the user 108.

The task module 224 generates the dynamic task list in response to a parking event. The parking event indicates that the vehicle 104 is present at charging station 102 to receive a charge. Therefore, a parking event may include the vehicle being plugged into the charging station 102. For example, the parking event may be defined by the charging station 102 being electrically engaged with the vehicle 104, for example, via a cable or connector is physically engaged with an adapter (not shown) of the vehicle 104. Thus, the task module 224 may identify a parking event based on an electrical connection between the vehicle 104 and the charging station 102. In another embodiment, suppose the charging station 102 provides inductive charging by using, for example, inductive charging plates. When the vehicle 104 is in position to receive a charge via the inductive charging plates, the charging station 102 may receive charge parameters via the communication system 234. The charge data may include charge parameters (e.g., charging protocols, voltage pattern, make and model, license plate number, state of charge (SOC), charge power, charge speed, charge rate, etc. The charge parameters may also be received from the vehicle 104, for example from the vehicle systems 248. Receiving the charge parameters may trigger the task module 224 to detect a parking event.

The parking event may also include the vehicle 104 being immobile within a predetermined parking distance of the charging station 102. Suppose that the predetermined parking distance is one meter. If the transmission of the vehicle 104 is placed into park, within one meter of the charging station 102, the station sensors 210 may detect a charge parameter, such as the license plate number, using the optical sensor 236. Alternatively, the task module 224 may receive vehicle data from the vehicle sensors 246 and/or the vehicle systems 248 that identify the charging station 102 and likewise determine that the vehicle 104 is with the predetermined parking distance of the charging station 102. The vehicle 104 may additionally be determined to be immobile when the brake is applied. Accordingly, if the task module 224 receives vehicle data from the vehicle systems 248 that the brake of the vehicle 104 is applied until the vehicle 104 stops or the brake is applied for a predetermined amount of time, the task module 224 may identify a parking event.

User activity may additionally be used by the task module 224 to identify a parking event. For example, if the user 108 is in computer communication with the charging station 102 or a charging entity that manages the charging station 102, the task module 224 may identify a parking event. Computer communication in this embodiment, may include searching for a charging station 102 at the vehicle location 112, making a reservation at the charging station 102, making a payment to the charging station 102 or associated charging entity, etc.

Suppose the user 108 is using vehicle system 248 and/or the portable device 110 to search for a charging station, such as the charging station 102, at the vehicle location 112. If the vehicle 104 is mobile (i.e., moving) by the charging station 102, the task module 224 may still identify a parking event based on computer communication of searching for a charging station at the location, even though neither the vehicle 104 being mobile near the charging station 102 nor searching for a charging station alone would trigger identification of a parking event by the task module 224. Accordingly, the vehicle 104 being immobile within a predetermined parking distance of the charging station, or the vehicle 104 being mobile within the predetermined parking distance of the charging station and the user being in computer communication with the charging station, would trigger the task module 224 to identify a parking event.

In some embodiments, the user activity may include user input on the dynamic task list 402. For example, the user 108 may be able to make a user selection 418 for a task on the dynamic task list 402. Suppose the user 108 is planning on making a deposit at the bank 114 and grab a coffee at the coffee shop 116. The user may select a check box or radio button as a user selection 418 associated with the first task 404 for the making a deposit at the bank 114 and the third task 408 grab a coffee at the coffee shop 116. In this manner, the user 108 may indicate the task that the user 108 plans to perform.

At block 304, the method 300 includes the charge module 226 determining a charge period 420 for the vehicle at the charging station 102 based on the one or more charging parameters discussed above. The charge period 420 is the length of time that the vehicle 104 is expected to be receiving a charge from the charging station 102. In one embodiment, the charge module 226 may calculate the charge period 420 based on the current SOC of the vehicle 104, charging speed of the charge being delivered by the charging station, and/the desired SOC. For example, charge module 226 may receive charging parameters from the charging station 102, the vehicle 104, the remote server 202, etc. For example, the charge module 226 may receive charging parameters including the initial and/or current SOC and the charging speed tiers available from the charging station 102. For example, the charging station 102 may have provided the vehicle 104 energy at a fast charging speed tier rather than a default charging speed tier to reach the desired SOC of the vehicle 104. The charge module 226 may additionally determine the charge period based on charging parameters, such as state of charge (SOC) of the vehicle, usage of the charging station or charging entity by other vehicles, charging speed, ambient temperature, grid demand, etc.

As shown in FIG. 4, the charge period 420 may be displayed, for example, on a display of the portable device 110. The charge period 420 may be used for reference by the user 108. Accordingly, the charge period 420 may be continually updated as the vehicle 104 receives a charge and the charge period 420 correspondingly decreases.

At block 306, the method 300 includes the return module 228 calculates a user return period based on a return distance between the user 108 and the vehicle 104. In particular, the user return period is based on a current location of the user 108. The return module 228 may identify the current location of the user 108 using location services, for example, the GPS, the position determination unit 218, etc., of the portable device 110. For example, the return module 228 may ping the portable device 110 the user 108. The portable device 110 may respond with response signal. The return module 228 may determine how far away the user 108 is based on the amount of time it takes to receive the response signal from the portable device 110. In another embodiment, the return module 228 may ping the vehicle 104 and the portable device 110, and triangulate the distance between the user 108 and the vehicle 104. In another embodiment, the return module 228 may query the portable device 110 for location data and receive location data in response. The location data may include the current location of the portable device 110, and by extension the user 108, or may include information enabling the return module 228 to calculate the current location of the user 108. The location data may include coordinates of the portable device 110, radial distances, mapping, turn-by-turn directions, previous, current, or predictive locations of the portable device 110, etc.

The return module 228 estimates the user return period of the user 108 based on the position of the user 108. Suppose that the user 108 is determined to be at the bank 114. The return module 228 may determine a distance to the bank 114, for example, the distance from the bank 114 to the vehicle 104 at the charging station 102 may be a half mile. The return module 228 may store distances from the charging station 102 to local sites, such as the bank 114, the coffee shop 116, and the grocery store 118.

In another embodiment, the return module 228 may access the remote server 202 to identify the current location of the user 108. For example, the remote server 202 may store distances from the charging station 102 to local sites, as the bank 114, the coffee shop 116, and the grocery store 118, in a look-up table. In another embodiment, the return module 228 may access the remote server 202 for location data associated with the user 108. In one embodiment, the user may check-in to the vehicle location 112 via social media platforms using the portable device 110. The remote server 202 may forward information about that check-in, such as the vehicle location 112 or location data to the return module 228.

When the location of the user 108 is known, the return module 228 may estimate the user return period of the user 108 based on the return rate of the user 108. The return rate is an estimated or calculated speed at which the user 108 returns to the vehicle 104. The return rate may be based on the average footspeed of the user 108 or average footspeed an adult. The return rate may be personalized for the user based on an iterative determination of the current location of the user 108. For example, the return module 228 may calculate the return rate of the user 108 based on two or more locations of the user 108, such as a first location of the user 108 at a first time and a second location of the user 108 at the second time. In another embodiment, the return rate may be provided by the portable device 110. For example, the portable device 110 may generate and store portable device data. Suppose that the portable device 110 is an activity tracker. The portable device data may include information about the portable device 110 and/or the user 108, such as the position data, the speed of the user 108, and/or the return rate.

The return module 228 may be triggered to estimate the user return period of the user 108. Therefore, in some embodiments, the return module 228 may not act to estimate the user return period until a charging parameter is satisfied. For example, the return module 228 may estimate the user return period in response to the vehicle 104 receiving a threshold amount of charge. Suppose that the initial SOC limit is 60% of the battery capacity of the vehicle 104. The return module 228 may be triggered to estimate the user return period of the user 108 when the vehicle reaches a threshold SOC of the initial SOC limit. If the threshold SOC corresponds to 5% of the battery capacity, the return module 228 would trigger the estimate of the user return period when the vehicle 104 reaches 55% of the battery capacity given the initial SOC of 60%. Accordingly, the threshold SOC is a predetermined percentage of the initial SOC.

The return module 228 may also be triggered to estimate the user return period of the user 108 based on the schedule of the user 108. Returning to the cinema example from above, suppose that the end time of the movie is 10:00 PM. The return module 228 may be triggered to estimate the user return period of the user 108 at 10:00 PM. In this manner, the return module 228 may determine if the user 108 is returning to the vehicle 104 or moving farther away. Suppose the user 108 moves from the cinema, a first location, towards a second location, such as the coffee shop 116. The return module 228 may estimate user return period of the user 108 as becoming further in to the future as the user 108 is getting farther and farther away. Accordingly, the return module 228 may be triggered based on the schedule.

At block 308, the method 300 includes the notification module 230 displaying a timing indicator with one or more of the plurality of tasks on the dynamic task list based on the task period and the user return period. The notification module 230 may cause a timing indicator to be displayed on the portable device 110 of the user 108. For example, the timing indicator may be an SMS message, a push notification, or other type of message. The timing indicator may indicate the amount of time the user 108 has before the charge period and/or user return period elapses. For example, the timing indicator may include the charge period 420. The timing indicator may also include displaying a return map 422. The return map 422 may illustrate a return path 424 for the user to return to the vehicle 104.

In some embodiments, the timing indicator may include a completion probability 426. The completion probability 426 indicates whether the associated task can be completed before the charge period 420 elapses. Accordingly, the completion probability 426 may be based on the charge period as compared to the task period 416. Suppose the charge period is one hour. The completion probability 426 may indicate that the first task 404 which has a task period 416 of ten minutes, the third task 408 which has a task period 416 of fifteen minutes, and the fifth task 412 with a task period of five minutes can be completed within the charge period. The completion probability 426 may further indicate that the second task 406 which has a task period 416 of fifty minutes may or may not be achievable within the charge period. The completion probability 426 may yet further indicate that the fourth task 410 which has a task period of three hours and the six task 414 which has a task period 416 of 75 minutes cannot be completed. The completion probability 426 may be dynamic and change because it is based on the charge period 420.

The completion probability 426 may indicate that the first task 404 which has a task period 416 of ten minutes, the third task 408 which has a task period 416 of fifteen minutes, and the fifth task 412 with a task period of five minutes can be completed within the charge period. The completion probability 426 may further indicate that the second task 406 which has a task period 416 of fifty minutes may or may not be achievable within the charge period. The completion probability 426 may yet further indicate that the fourth task 410 which has a task period of three hours and the six task 414 which has a task period 416 of 75 minutes cannot be completed. The completion probability 426 may be dynamic and change because it is based on the charge period 420.

Figure 5:
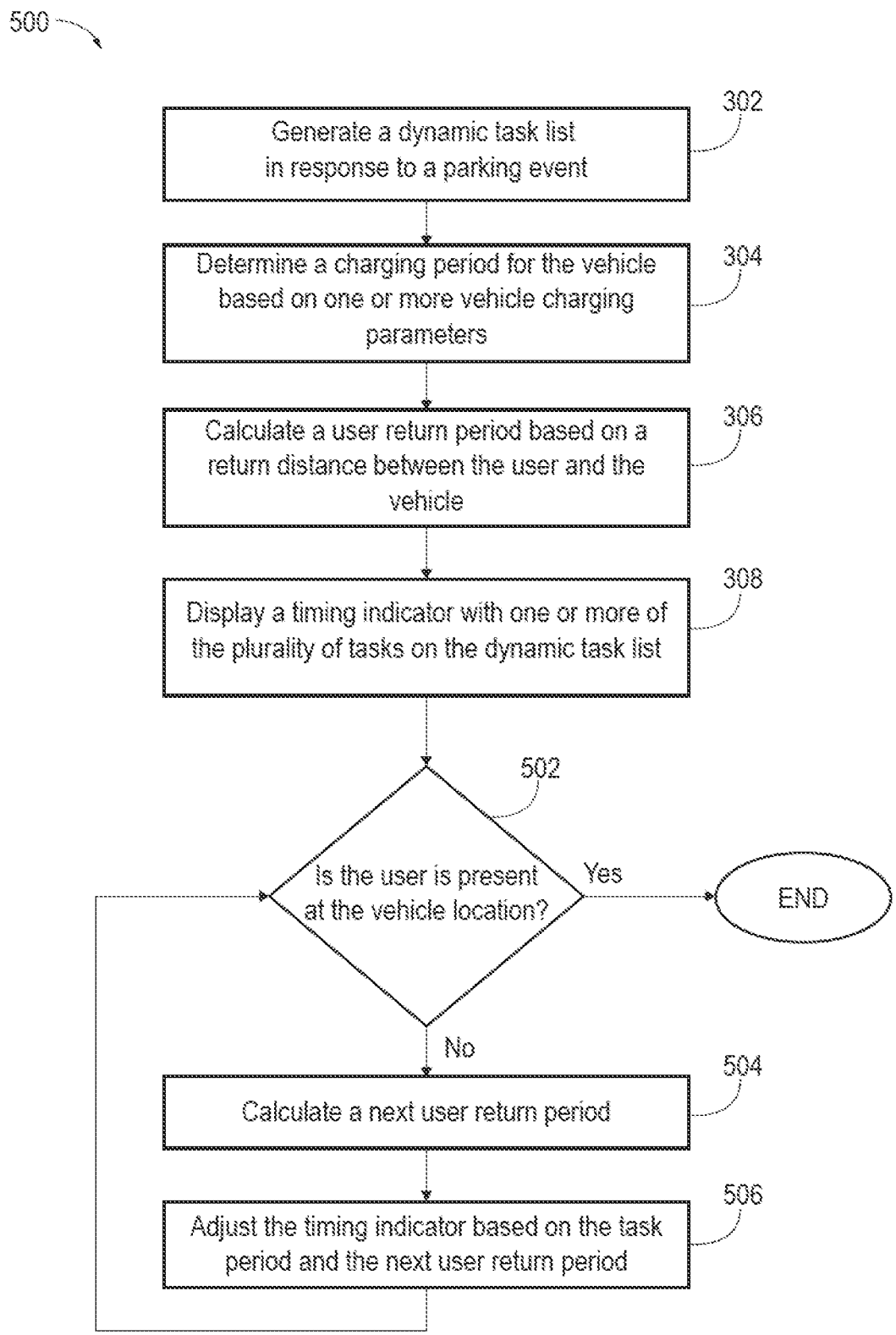
FIG. 5 is a process flow for iteratively determining a user return period for providing distance-based notifications, according to one embodiment.

FIG. 5 is a process flow for iteratively determining a user return period for providing distance-based notifications, according to one embodiment. FIG. 5 recites similar steps as FIG. 3 which operate in a similar manner as described above. FIG. 5 will be described with reference to FIGS. 1-4. As shown in FIG. 5, the method for determining a user return period for providing distance-based notifications is described according to a number steps for simplicity, but it is understood that the elements of the method 500 can be organized into different architectures, blocks, stages, and/or processes.

At block 302, the method 500 includes generating the dynamic task list 402 in response to the task module 224 detecting a parking event. At block 304, the method 500 includes the charge module 226 determining a charge period 420 for the vehicle 104 based in one or more charging parameters. At block 306, the method 500 includes the return module 228 calculating a user return period based on the return distance between the user 108 and the vehicle 104. At block 308, the method 500 includes the notification module 230 causing a timing indicator to displayed. The timing indicator may be associated with one or more of the plurality of tasks on the dynamic task list 402.

At block 502, the method 500 includes the return module 228 determining if the user 108 is present at the vehicle location of the vehicle 104. The return module 228 may determine whether the user 108 is present at the vehicle location based on location data from the portable device 110. For example, the return module 228 may use the position determination unit 218 and the location data to determine whether the user 108 is within a threshold distance of the vehicle location. In another embodiment, the vehicle sensors 246 and/or the vehicle systems 248 to determine if the user 108 is within the threshold distance of the vehicle location. For example, the vehicle sensors 246 and/or the vehicle systems 248 may detect a key fob of the user 108. The threshold distance may be the detection range of the key fob. As another example, user weight sensors in the seats of the vehicle 104 may indicate that the user is seated in the vehicle 104.

If it is determined that the user 108 is within the threshold distance, the method 500 ends. If it is determined that the user 108 is not within the threshold distance, the method continues to block 504.

At block 504, the method 500 includes calculating a next user return period. The next user return period is calculated by the return module 228 in a similar manner as the return period is calculated at block 306. For example, the next user return period based on a return distance between the user 108 and the vehicle 104. A next user return period is calculated because the user may have moved from a previous position. Suppose that at a first time, the user 108 is at the coffee shop 116 and thus the return period is based on a first return distance from the user 108, at the coffee shop 116, to the vehicle 104. At a second time, the user 108 is at the bank 114 and accordingly the next return period is based on a second return distance from the user 108, at the bank 114, to the vehicle 104. Therefore, like, the initial return period, the next return period is based on a current location of the user 108. As the current location of the user 108 changes, the current location of the user 108 is determined using location services, for example, the GPS, the position determination unit 218, etc., of the portable device 110. For example, the return module 228 may continually ping the portable device 110 the user 108.

At block 506, the method 500 includes the notification module 230 adjusting the timing indicator based on the task period 416 and the next user return period. Continuing the example from above, suppose that at the first time, the user 108 is at the coffee shop 116 and at the second time, the user 108 is at the bank 114. At the first time, the charge period 420 may be one hour, but fifteen minutes have elapsed while the user is getting the coffee, so that at the second time the charge period is forty-five minutes. Accordingly, applying for a loan at the bank 114, associated with the second task 406, which has a task period of fifty minutes may exceed the charge period 420. Thus, the completion probability 426 for the second task 406 may be dynamic and indicate that the second task is no longer possible as the user 108 would not be able to complete the second task and return to the vehicle 104. Accordingly, the dynamic task list 402 is updated based on the next user return period.

In this manner, the dynamic task list 402 may update the timing indicators to reflect the current ability of the user to complete a task such that the method 500 is iterative. Therefore, the method 500 returns to block 502, the return module 228 determining if the user 108 is present at the vehicle location of the vehicle 104. The dynamic task list 402 may order tasks on the dynamic task list 402 such that task that can be completed in the charge period 420 and the next return time are listed first on the dynamic task list.

Figure 6:
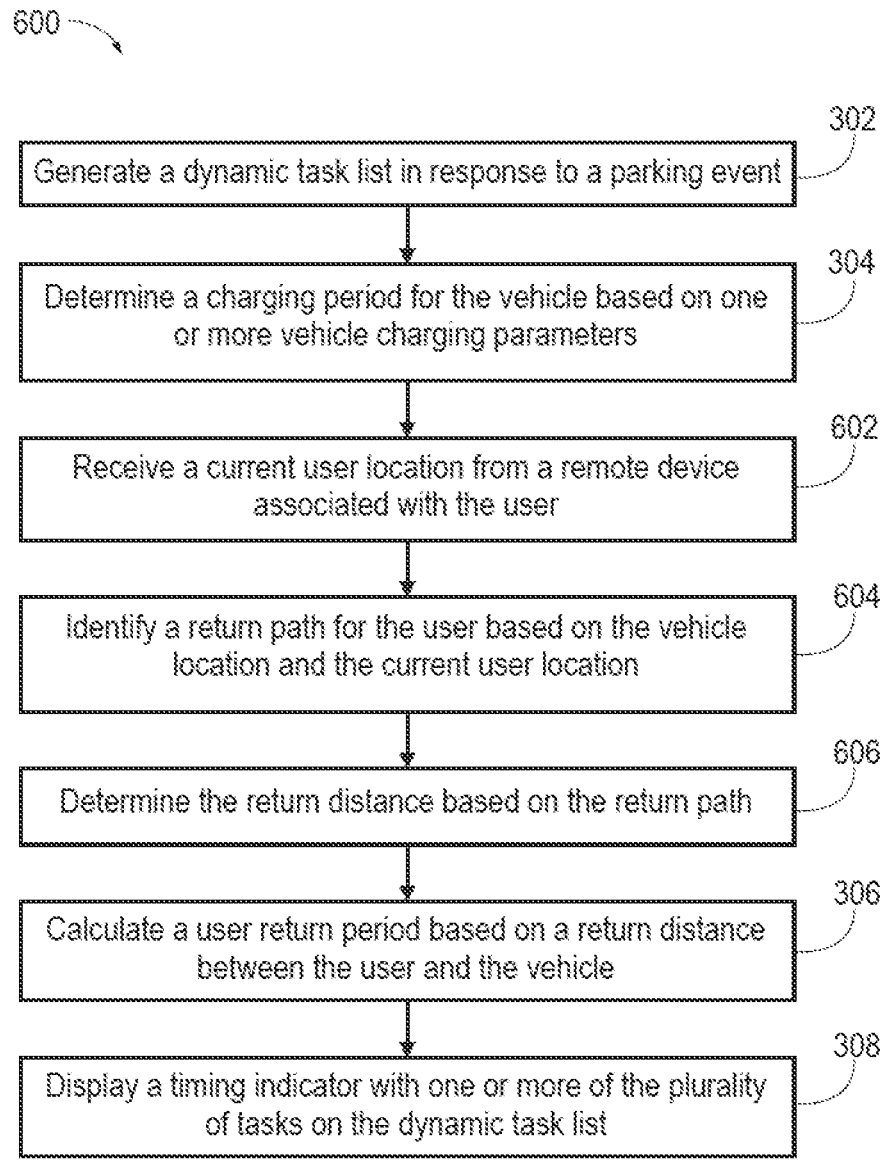
FIG. 6 is a process flow for calculating a return path for distance-based notifications, according to one embodiment.

FIG. 6 is a process flow for calculating a return path for distance-based notifications, according to one embodiment. FIG. 6 recites similar steps as FIG. 3 which operate in a similar manner as described above. FIG. 6 will be described with reference to FIGS. 1-4. As shown in FIG. 6, the method for determining a user return period for providing distance-based notifications is described according to a number steps for simplicity, but it is understood that the elements of the method 600 can be organized into different architectures, blocks, stages, and/or processes.

At block 302, the method 600 includes generating the dynamic task list 402 in response to the task module 224 detecting a parking event. At block 304, the method 600 includes the charge module 226 determining a charge period 420 for the vehicle 104 based in one or more charging parameters.

At block 602, the method 600 includes receiving a current user location from a portable device 110 associated with the user 108. As discussed above, the current location of the user may be determined using location services, for example, the GPS, the position determination unit 218, etc., of the portable device 110. For example, the return module 228 may continually ping the portable device 110 the user 108.

At block 604, the method 600 includes the return path 424 for the user 108 based on the vehicle location and the current location of the user 108. The return path 424 may be based on known paths (e.g., roads, sidewalks, train tracks, bike lanes, shipping lanes, etc.). The known paths may be determined from maps and/or location data about the vehicle location 112. In some embodiments, maps may be received from the remote server 202. The return path 424 may be determined based on location data from the portable device 110 of the user. For example, the location data may track the path of the user to determine the return path 424.

At block 606, the method 600 includes determining the return distance based on the return path 424. The return distance may be based on the current location of the user may be determined using location services, for example, the GPS, the position determination unit 218, etc., of the portable device 110. At block 306, the method 500 includes the return module 228 calculating a user return period based on the return distance between the user 108 and the vehicle 104. At block 308, the method 500 includes the notification module 230 causing a timing indicator to displayed. The timing indicator may be associated with one or more of the plurality of tasks on the dynamic task list 402.

Figure 7:
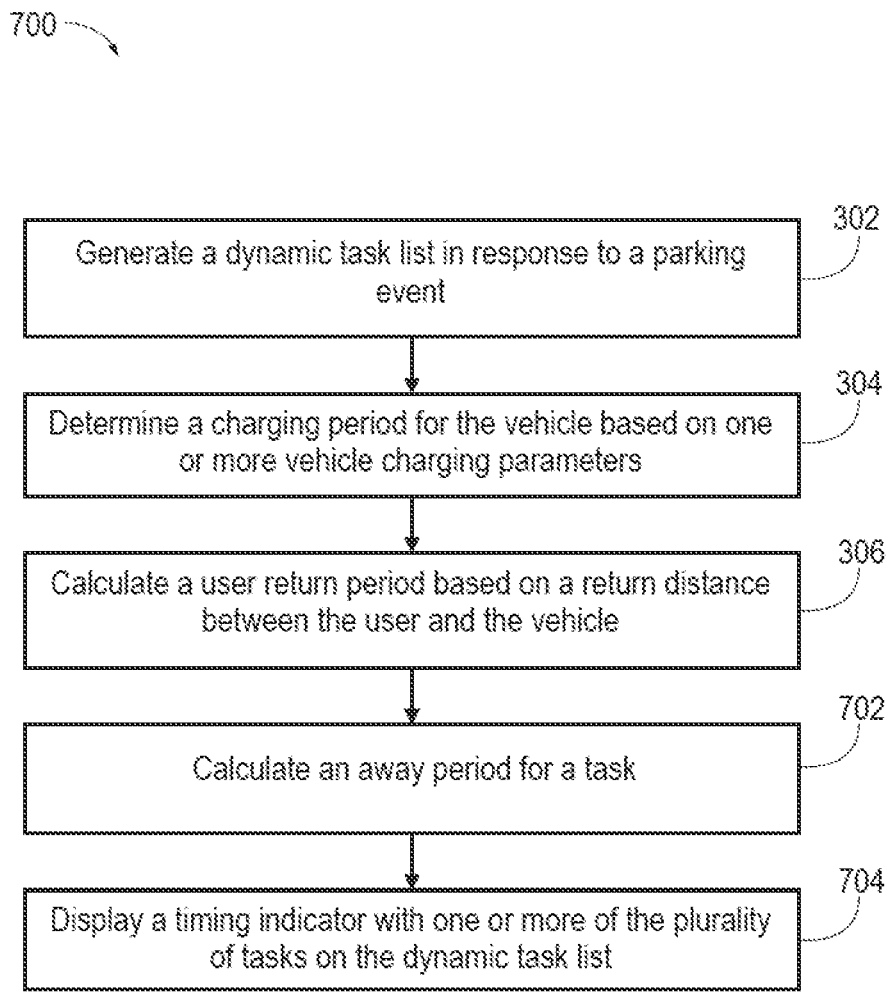
FIG. 7 is a process flow for removing task from a dynamic task list for distance-based notifications for electric vehicles, according to one embodiment.

FIG. 7 is a process for removing task from a dynamic task list for distance-based notifications for electric vehicles, according to one embodiment. FIG. 7 recites similar steps as FIG. 3 which operate in a similar manner as described above. FIG. 7 will be described with reference to FIGS. 1-4. As shown in FIG. 7, the method for determining a user return period for providing distance-based notifications is described according to a number steps for simplicity, but it is understood that the elements of the method 700 can be organized into different architectures, blocks, stages, and/or processes.

At block 302, the method 700 includes generating the dynamic task list 402 in response to the task module 224 detecting a parking event. At block 304, the method 700 includes the charge module 226 determining a charge period 420 for the vehicle 104 based in one or more charging parameters. At block 306, the method 700 includes the return module 228 calculating a user return period based on the return distance between the user 108 and the vehicle 104.

At block 702, the method 700 includes calculating an away period for a task. The away period of a task is the task period and the return time. Suppose that the return time from the bank 114 is fifteen minutes. Accordingly, the away period for the first task 404 includes the task period 416 being ten minutes and the return time being fifteen minutes, the away period for the first task 404 is twenty-five minutes. Similarly, the away period for the second task 406 includes the task period 416 being fifty minutes and the return time being fifteen minutes, the away period for the second task 406 is an hour and five minutes.

At block 704, the method 700 includes the notification module 230 causes a timing indicator to displayed based on the away period. For example, if the away period for a task exceeds the charge period 420, the timing indicator for that task may indicate that the task cannot be completed. Continuing the example from above, Suppose the charge period is one hour but the away time for second task 406 is one hour and five minutes. For example, the completion probability 426 for the second task 406 may be displayed to indicate that the second task is not achievable within the charge period 420. Accordingly, the notification module 230 may display notifications in a similar manner as described above with respect to block 308, based on the task period and the return period, as an away time, for one or more of the tasks on the dynamic task list 402.

Figure 8:
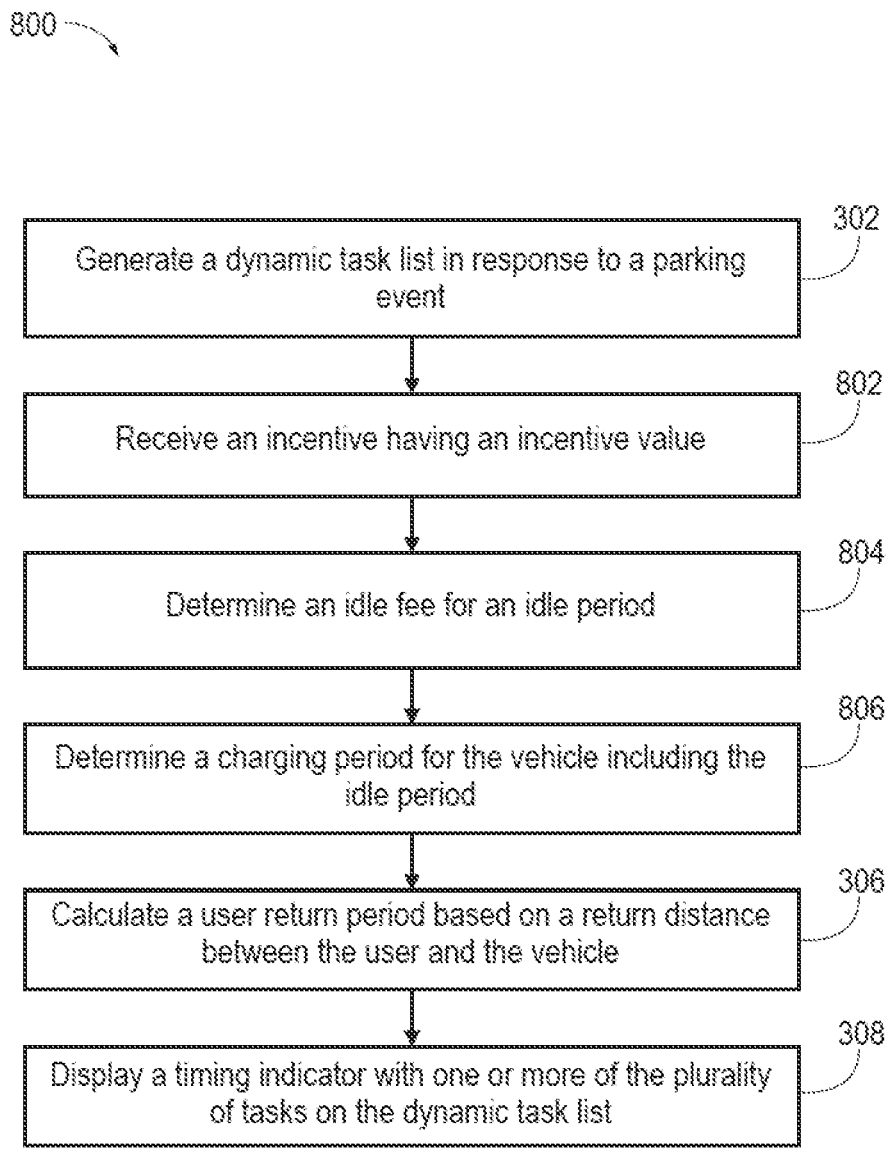
FIG. 8 is a process flow for incentive balancing for distance-based notifications for electric vehicles, according to one embodiment.

FIG. 8 is a process flow for incentive balancing for distance-based notifications for electric vehicles, according to one embodiment. FIG. 8 recites similar steps as FIG. 3 which operate in a similar manner as described above. FIG. 8 will be described with reference to FIGS. 1-4. As shown in FIG. 8, the method for determining a user return period for providing distance-based notifications is described according to a number steps for simplicity, but it is understood that the elements of the method 800 can be organized into different architectures, blocks, stages, and/or processes.

At block 302, the method 800 includes generating the dynamic task list 402 in response to the task module 224 detecting a parking event. For example, suppose that the user 108 is at the bank applying for a loan. The task module 224 receives task data associated with the second task 406 having a task period of fifty minutes.

At block 802, the method 800 includes receiving an incentive value. The task module 224 may receive a compensation offer associated with the charging station 102, the vehicle 104, and/or user 108. For example, the task module 224 may be configured to communicate with the charging station 102 to receive incentive pricing schemes. In another embodiment, the task module 224 may communicate with remote server 208 to receive incentive pricing schemes. The incentive pricing schemes may include a price per kilowatt-hour of energy (price per kWh). Because the price of energy may by dynamic, the incentive pricing schemes may include a schedule indicating how the price of energy varies in time. The incentive may further include preferred queue/wait times, price incentives, charging types, discounts, amenities, and gifts (e.g., objects, tickets, etc.), among others. The incentive is associated with an incentive value, for example, if the incentive is a pricing scheme the incentive value may be calculated based on the initial SOC, desired SOC, and the pricing scheme. As another example, if the incentive is two movie tickets worth nine dollars each, the incentive value may be eighteen dollars. As yet another example, the incentive may be a free coffee with an incentive value of five dollars.

At block 804, the method 800 includes the charge module 226 determining an idle fee for an idle period. Suppose that the charging station 102 has implemented an idle penalty for vehicles that occupy the parking space 106 associated with the charging station 102 when not receiving a charge. The user 108 may incur a fee, typically per minute, for leaving the vehicle 104 plugged in after finished charging. The charge module 226 may determine the idle fee associated with an idle period. For example, suppose that the charging station 102 has an idle penalty of one dollar per five minutes. Accordingly, the charge module 226 may determine that for an idle period of fifteen minutes, the idle penalty is three dollars.

At block 806, the method 800 includes the charge module 226 determining a charge period for the vehicle including the idle period. The charge period 420 is the length of time that the vehicle 104 is expected to be receiving a charge from the charging station 102. Suppose that the vehicle 104 is expected to be charged for one hour and the idle period is fifteen minutes so that the charge period is seventy-five minutes. Accordingly, the charge period 420 includes both the charging time and the idle period. In some embodiments, the charge module 226 may include the idle period in the charge period 420 when the incentive fee exceeds the idle fee. If instead, the idle fee exceeds the incentive fee, the charge module 226 may calculate the charge period 420 without idle period.

At block 306, the method 500 includes the return module 228 calculating a user return period based on the return distance between the user 108 and the vehicle 104. The return module 228 may identify the current location of the user 108 using location services, for example, the GPS, the position determination unit 218, etc., of the portable device 110. Suppose that the user is at the bank 114 and the return time Suppose that the return time from the bank 114 is ten minutes.

At block 308, the method 500 includes the notification module 230 causing a timing indicator to displayed. The timing indicator may be associated with one or more of the plurality of tasks on the dynamic task list 402. In some embodiments, the timing indicator may include an incentive icon 428 associated with tasks on the dynamic task list 402 that are associated with an incentive value. For example, because the task period for the second task 406 is fifty minutes and the return time from the vehicle location 112 is ten minutes, as compared to the charge period 420 which is an hour. However, the task period for the third task 408 of getting a coffee is 15 minutes but an incentive icon 428 is displayed indicating that the user 108 would receive a free cup of coffee worth five dollars. The incentive icon 428 may be displayed since the incentive value exceeds the idle penalty.

Therefore, the systems and methods described herein provide timing indicators that account for the distance between the user 108 and the vehicle 104, the timing indicator may additionally allow the user 108 to determine when to return to their vehicle 104. Moreover, the user 108 may avoid incurring idle penalties as the user 108 can determine when to return to the vehicle 104 before the charge period 420 elapses while still optimizing the number of tasks that can be completed.

Figure 9:
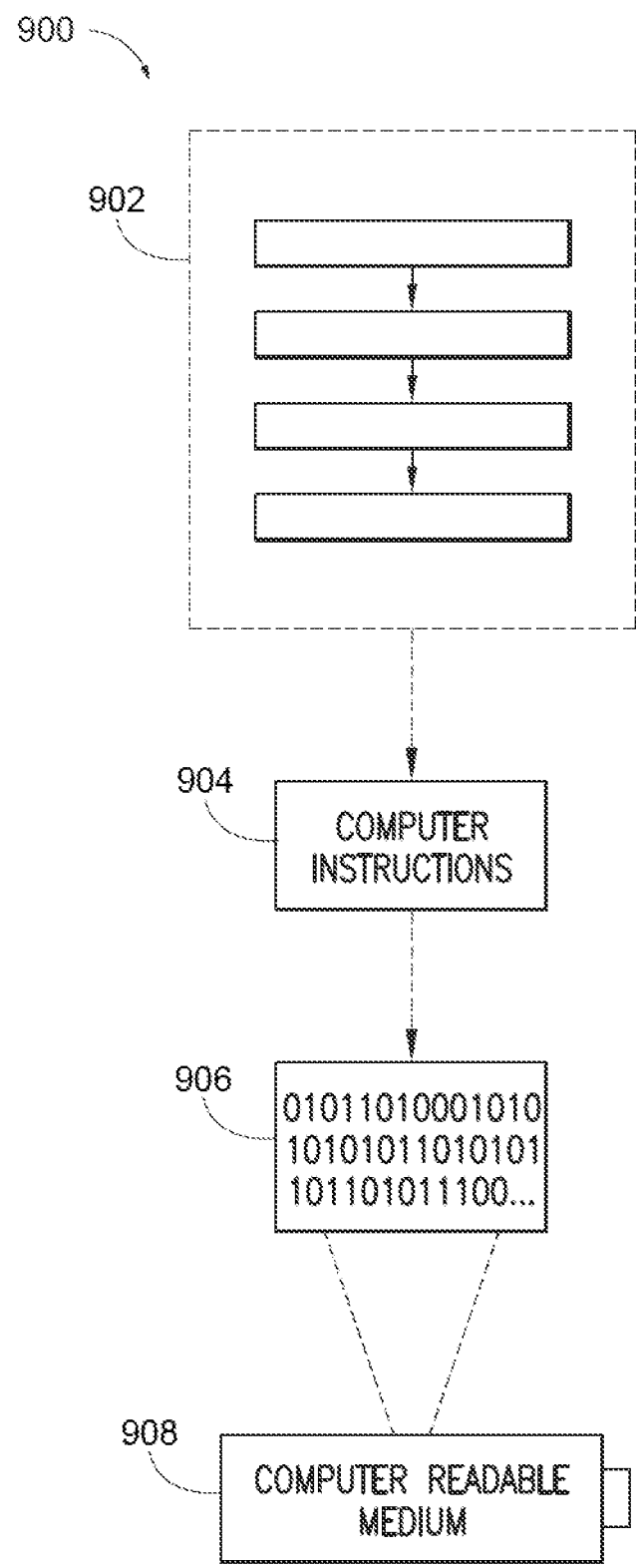
FIG. 9 is an illustration of an example computer-readable medium or computer-readable device including processor-executable instructions configured to embody one or more of the provisions set forth herein, according to one embodiment.

Still another aspect of the systems and methods providing distance-based notifications for electric vehicles involves a computer-readable medium including processor-executable instructions configured to implement one aspect of the techniques presented herein. An aspect of a computer-readable medium or a computer-readable device devised in these ways is illustrated in FIG. 9, wherein an implementation 900 includes a computer-readable medium 908, such as a CD-R, DVD-R, flash drive, a platter of a hard disk drive, etc., on which is encoded computer-readable data 906. This encoded computer-readable data 906, such as binary data including a plurality of zero's and one's as shown in 906, in turn includes a set of processor-executable computer instructions 904 configured to operate according to one or more of the principles set forth herein. In this implementation 900, the processor-executable computer instructions 904 may be configured to perform a method 902, such as the method 300 of FIG. 3, the method 500 of FIG. 5, the method 600 of FIG. 6, the method 700 of FIG. 7, or the method 800 of FIG. 8. In another aspect, the processor-executable computer instructions 904 may be configured to implement a system, such as the operating environment of FIG. 2. Many such computer-readable media may be devised by those of ordinary skill in the art that are configured to operate in accordance with the techniques presented herein.

The term "computer readable media" as used herein includes computer storage media. Computer storage media includes volatile and nonvolatile, removable and non-removable media implemented in any method or technology for storage of information such as computer readable instructions or other data. Memory 214 and data store 216 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 206.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system comprising:
a processor; and
a memory storing instructions that when executed by the processor cause the processor to:
generate a dynamic task list, having a plurality of tasks associated with a vehicle location of a vehicle, in response to a parking event, wherein each task of the plurality of tasks is an activity experienced by a user and has a task period defined as at least an expected amount of time that the activity will be experienced by the user;
determine a charge period for the vehicle at a charging station based on one or more vehicle charging parameters;
calculate a user return period based on a return distance between the user and the vehicle;
display a timing indicator with one or more of the plurality of tasks on the dynamic task list based on the task period for each task of the one or more tasks as compared to the charge period less the user return period;
calculate an away period for one or more of the plurality of tasks on the dynamic task list based on the task period for the task and the user return period; and
indicate on the dynamic task list that the task cannot be completed and/or remove the task from the dynamic task list in response to determining that the away period exceeds the charge period less the user return period.

2. The system of claim 1, wherein the task period is based on a user profile having historical data associated with the user.

3. The system of claim 1, wherein the parking event includes the vehicle receiving a charge from the charging station, the vehicle being immobile within a predetermined distance of the charging station, or the vehicle being mobile within the predetermined distance of the charging station and the user being in computer communication with the charging station.

4. The system of claim 1, wherein the one or more vehicle charging parameters include a state of charge (SOC) of the vehicle at the parking event and a charging speed of the charging station.

5. The system of claim 1, wherein the charge period includes an idle period associated with the charging station.

6. The system of claim 1, further comprises the memory storing instructions that when executed by the processor cause the processor to:
receive a current user location from a portable device associated with the user;
identify a return path for the user based on the vehicle location and the current user location; and
determine the return distance based on the return path.

7. The system of claim 1, further comprises the memory storing instructions that when executed by the processor cause the processor to:
determine whether the user is present at the vehicle location;
calculate a next user return period in response to determining that the user is not present at the vehicle location, wherein the next user return period is based on a current user location from a portable device associated with the user and the vehicle location; and
adjust the timing indicator based on the task period and the next user return period.

8. The system of claim 1, further comprises the memory storing instructions that when executed by the processor cause the processor to:
receive an incentive having an incentive value from an entity associated with the vehicle location; and
determine an idle fee for an idle period from a charge complete time to a user return time, wherein determining the charge period is further based on the idle period in response to determining that the incentive value exceeds the idle fee.

9. The system of claim 8, wherein the incentive is a pricing scheme.

10. A computer-implemented method comprising:
generating a dynamic task list, having a plurality of tasks associated with a vehicle location of a vehicle, in response to a parking event, wherein each task of the plurality of tasks is an activity experienced by a user and has a task period defined as at least an expected amount of time that the activity will be experienced by the user;
determining a charge period for the vehicle at a charging station based on one or more vehicle charging parameters;
calculating a user return period for the user based on a return distance between the user and the vehicle; and
displaying a timing indicator with one or more of the plurality of tasks on the dynamic task list based on the task period for each task of the one or more tasks as compared to the charge period less the user return period;
calculating an away period for one or more of the plurality of tasks on the dynamic task list based on the task period for the task and the user return period; and
indicating on the dynamic task list that the task cannot be completed and/or removing the task from the dynamic task list in response to determining that the away period exceeds the charge period less the user return period.

11. The computer-implemented method of claim 10, wherein the task period is based on a user profile having historical data associated with the user.

12. The computer-implemented method of claim 10, further comprising:
receiving a current user location from a portable device associated with the user;
identifying a return path for the user based on the vehicle location and the current user location; and
determining the return distance based on the return path.

13. The computer-implemented method of claim 10, further comprising:
determining whether the user is present at the vehicle location;
calculating a next user return period in response to determining that the user is not present at the vehicle location, wherein the next user return period is based on a current user location from a portable device associated with the user and the vehicle location; and
adjusting the timing indicator based on the task period and the next user return period.

14. The computer-implemented method of claim 10, further comprising:
receiving an incentive having an incentive value from an entity associated with the vehicle location; and
determining an idle fee for an idle period from a charge complete time to a user return time, wherein determining the charge period is further based on the idle period in response to determining that the incentive value exceeds the idle fee.

15. A non-transitory computer readable storage medium storing instructions that when executed by a computer, which includes a processor to perform a method comprising:
generating a dynamic task list, having a plurality of tasks associated with a vehicle location of a vehicle, in response to a parking event, wherein each task of the plurality of tasks is an activity experienced by a user and has a task period defined as at least an expected amount of time that the activity will be experienced by the user;
determining a charge period for the vehicle at a charging station based on one or more vehicle charging parameters;
calculating a user return period of the user based on a return distance between the user and the vehicle;
displaying a timing indicator with one or more of the plurality of tasks on the dynamic task list based on the task period for each task of the one or more tasks as compared to the charge period less the user return period;
calculating an away period for one or more of the plurality of tasks on the dynamic task list based on the task period for the task and the user return period; and
indicating on the dynamic task list that the task cannot be completed and/or removing the task from the dynamic task list in response to determining that the away period exceeds the charge period less the user return period.

16. The non-transitory computer readable storage medium of claim 15, wherein the task period is based on a user profile having historical data associated with the user.

17. The non-transitory computer readable storage medium of claim 15, further comprising:
receiving a current user location from a portable device associated with the user;
identifying a return path for the user based on the vehicle location and the current user location; and
determining the return distance based on the return path.

18. The non-transitory computer readable storage medium of claim 16, further comprising:

determining whether the user is present at the vehicle location;

calculating a next user return period in response to determining that the user is not present at the vehicle location, wherein the next user return period is based on a current user location from a portable device associated with the user and the vehicle location; and adjusting the timing indicator based on the task period and the next user return period.

19. The non-transitory computer readable storage medium of claim 15, further comprising:

receiving an incentive having an incentive value from an entity associated with the vehicle location; and determining an idle fee for an idle period from a charge complete time to a user return time, wherein determining the charge period is further based on the idle period in response to determining that the incentive value exceeds the idle fee.

* * * * *